(No Model.)

M. WOLLMAN.
WATCH MAKER'S TOOL.

No. 456,975. Patented Aug. 4, 1891.

WITNESSES:
Saml. R. Turner
Van Buren Hillyard,

INVENTOR
Maurice Wollman.
BY
R.S. & A.R. Lacey
HIS ATTORNEY'S

UNITED STATES PATENT OFFICE.

MAURICE WOLLMAN, OF COUNCIL BLUFFS, IOWA.

WATCH-MAKER'S TOOL.

SPECIFICATION forming part of Letters Patent No. 456,975, dated August 4, 1891.

Application filed October 2, 1890. Serial No. 366,883. (No model.)

*To all whom it may concern:*

Be it known that I, MAURICE WOLLMAN, a citizen of the United States, residing at Council Bluffs, in the county of Pottawattamie and State of Iowa, have invented certain new and useful Improvements in Watch-Makers' Tools; and I do hereby declare the following to be a full, clear, and exact description of the invention, such as will enable others skilled in the art to which it appertains to make and use the same.

This invention relates to watch-maker's centering and drilling tool, and aims to provide a tool which will facilitate the work of drilling the ends of staffs and insure perfect accuracy and prevent the breakage of so many drills as results from the use of the tools generally employed for this purpose.

The improvement consists of a center to be inserted in the tail-stock of any watch-maker's lathe, having a central bore, a drill located in the bore, a cross-head to be operated on by the hand to press the drill forward, and a centering-cap to center the staff to be drilled, also the drill, thereby insuring perfect accuracy in the work.

The improvements also consist in the novel features and the peculiar construction and combination of the parts, which will be hereinafter more fully described and claimed, and which are shown in the annexed drawings, in which—

Figure 1:
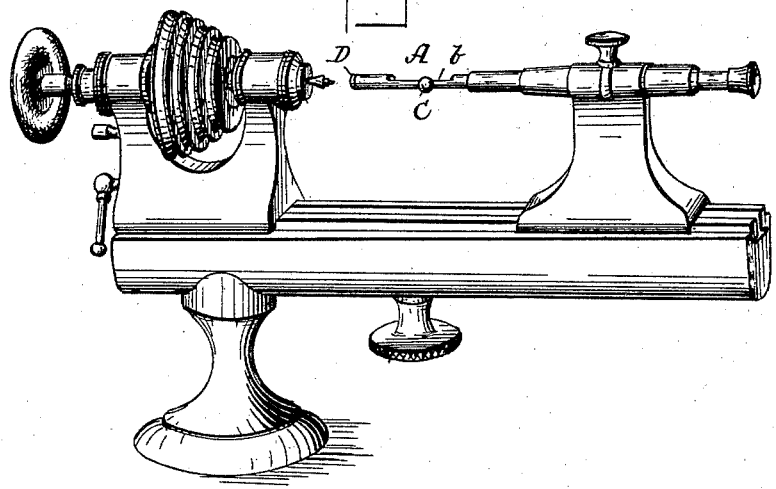
Figure 2:
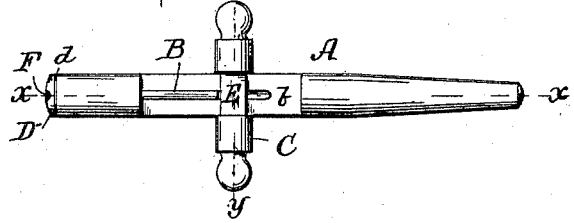
Figure 4:
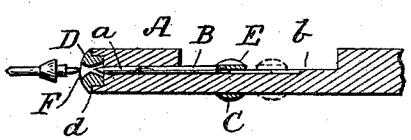
Figure 3:
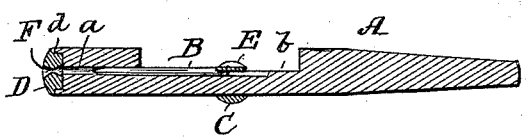
Figure 5:
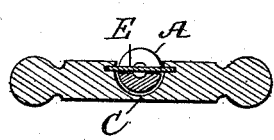

Figure 1 is a perspective view showing the application of the invention. Fig. 2 is a top plan view of the tool on an enlarged scale. Fig. 3 is a longitudinal section on the line X X of Fig. 2. Fig. 4 is a detail view showing the operation of the invention. Fig. 5 is a cross-section on the line Y Y of Fig. 2.

The lathe shown forms no part of the present invention, being of well-known construction, and illustrated to show the application of the invention.

The tool comprises the center A, having the longitudinal bore $a$, the drill B, inserted in the bore and adapted to work therein, the cross-head C, which engages with and is adapted to be pressed on to project the drill, and the centering-cap D, which is fitted to the end of the center, and is constructed to center the drill and the staff to be drilled. The purpose of the cross-head C is to enable the operator to press the drill forward to the work, also to prevent the rotation of the drill when advanced to the work, and, as shown, it is cut out on its upper side to embrace the lower portion of the center at its cut-away portion $b$, the plate E, extending over the upper side of the center at $b$, being securely fastened at its ends to the cross-head. The inner end of the drill is flattened to pass beneath the plate E, and is thereby held from rotation. The end of the center A is recessed, and the cap D is constructed to fit in the said recess and be held therein by friction. An exterior flange $d$ overlaps the end of the center and limits the inward movement of the said cap. The opening F in the cap is small and flares in each direction from a central or intermediate point between the ends of the cap to guide the drill and the work to the said opening F.

In practice the tool is placed in the tail-stock of a lathe and the staff to be drilled is secured to the head-stock of the same lathe. The staff is rotated and the tail-stock is advanced until the end of the staff to be drilled enters the cap D and is centered therein. The cross-head is pressed forward to advance the drill to the work, the drill and the staff both being centered by the plate D.

Having thus described my invention, what I claim, and desire to secure by Letters Patent, is—

1. A watch-maker's tool composed of a center having a central bore, a drill located in the bore, a cross-head for operating the drill, and a centering-cap for centering the work and the drill, substantially as described.

2. The combination, with the center having a central bore and the drill located in the bore, of the centering-cap having a central opening which flares in each direction for centering the work and the drill, substantially as described.

3. The combination, with the center having a central bore and having a portion, as at $b$, cut away, and the drill, of the cross-head and the plate E, substantially as and for the purpose set forth.

In testimony whereof I affix my signature in the presence of two witnesses.

MAURICE WOLLMAN.

Witnesses:
J. C. LANGE,
W. A. BANKS.